United States Patent

Foster et al.

[15] 3,674,666
[45] July 4, 1972

[54] ENHANCING REACTION RATES

[72] Inventors: Richard N. Foster, Boston, Mass.; John B. Butt, Wilmet, Ill.

[73] Assignee: said Foster, by said Butt

[22] Filed: Aug. 19, 1970

[21] Appl. No.: 64,998

[52] U.S. Cl. ............................ 204/164, 204/168, 204/171, 204/312
[51] Int. Cl. ............................................ B01k 1/00
[58] Field of Search .................... 204/312, 164, 168, 171

[56] References Cited

UNITED STATES PATENTS 3,421,988    1/1969    Rochow .............................. 204/164

*Primary Examiner*—John H. Mack
*Assistant Examiner*—Neil A. Kaplan
*Attorney*—Willis M. Ertman

[57] ABSTRACT

Process and apparatus for effecting a chemical reaction in an electrically uncharged reactant to produce a product by introducing reactant into a chemical reactor having walls defining a chamber, a reaction zone within the chamber, and an inlet to admit reactant to the chamber, a first electrode and a second electrode spaced therefrom, the electrodes being opposed across the reaction zone, a supporting structure of electrically non-conductive material supported between the electrodes and in the reaction zone, the structure having channels for passage of reactant and product material, a plurality of electrically conductive particles separately supported on the structure, the particles being electrically insulated one from another and having surface portions exposed to direct contact with reactant in the channels, the surface portions having catalytic effect which is enhanced by changing the electric charge on the surface portions, and means connected to the electrodes for establishing an electrical potential difference between said electrodes. Reactant is brought into contact with said surface portions of said particles while simultaneously applying an electric potential difference across the electrodes to produce an electric field which changes the charge on said exposed surface portions of the electrically conductive particles and thereby enhances the catalytic effect of said exposed surface portions in producing the product.

10 Claims, 5 Drawing Figures

ENHANCING REACTION RATES

BACKGROUND OF THE INVENTION

This invention relates to the modification of heterogeneously catalyzed chemical reaction rates by electric fields. It has previously been observed that the catalytic effect of certain heterogeneous catalysts in promoting certain chemical reactions is modified when an electric field is present at the surface of the catalyst. Results of these investigations have, however, been applicable only to laboratory experiments involving very small production of products, and investigators have heretofore been unsuccessful in achieving practical processes and apparatus obtaining the benefits of large catalyst area and electric field enhancement applicable to production on a commercial scale.

SUMMARY OF THE INVENTION

A primary object of this invention is enhancing reaction rates in a chemical reactor. Other objects are producing a desired mix in the output products of a chemical reactor, and reducing the size and cost of a chemical reactor for a given output.

The invention features a process and apparatus for effecting a chemical reaction in an electrically uncharged reactant to produce a product by introducing reactant into a chemical reactor having walls defining a chamber, a reaction zone within the chamber, and an inlet to admit reactant to the chamber, a first electrode and a second electrode spaced therefrom, the electrodes being opposed across said reaction zone, a supporting structure of electrically non-conductive material supported between the electrodes and in the reaction zone, the structure having channels for passage of reactant and product material, a plurality of electrically conductive particles separately supported on the structure, the particles being electrically insulated one from another and having surface portions exposed to direct contact with reactant in the channels, the surface portions having catalytic effect which is enhanced by changing the electric charge on the surface portions, means connected to the electrodes for establishing an electrical potential difference between the electrodes and means for bringing the reactant into contact with the surface portions of the particles while simultaneously maintaining said electric potential difference across the electrodes to produce an electric field which changes the charge on the exposed surface portions of the electrically conductive particles and thereby to enhance the catalytic effect of the exposed surface portions in producing said product.

The present invention employs an electric field to polarize each of a plurality of electrically conductive catalytic particles separated and therefore insulated from one another. As a result of the polarization of the particles, the charge distribution on the surface of the particles is altered with a corresponding change in the catalytic activity of the surface. In using an electric field to modify the activity of the catalytic surface, the present invention is different from the prior art techniques which use a field to increase the energy of the reactants in the fluid phase.

A preferred embodiment features a rigid structure supporting catalytic particles with points having radii of curvature less than 100A. and with an exposed catalytic surface aggregating more than 0.1 m$^2$ per gram of supporting structure.

The preferred embodiment employs the invention to produce propylene from propane with a chromia catalyst, but the invention may also be employed in producing other products and with other catalysts—for example—the production of ethylene from ethanol with zinc oxide catalyst. The process and apparatus may also be applied to much larger installations with correspondingly larger production.

Other objects, features, and advantages will appear from the following description of a preferred embodiment of the invention, taken together with the attached drawing thereof.

BRIEF DESCRIPTION OF THE DRAWING

FIG. 2b is a view cut away and further enlarged of a portion of a grain from the support bed shown in FIG. 2a;

DESCRIPTION OF PREFERRED EMBODIMENT

Figure 1:
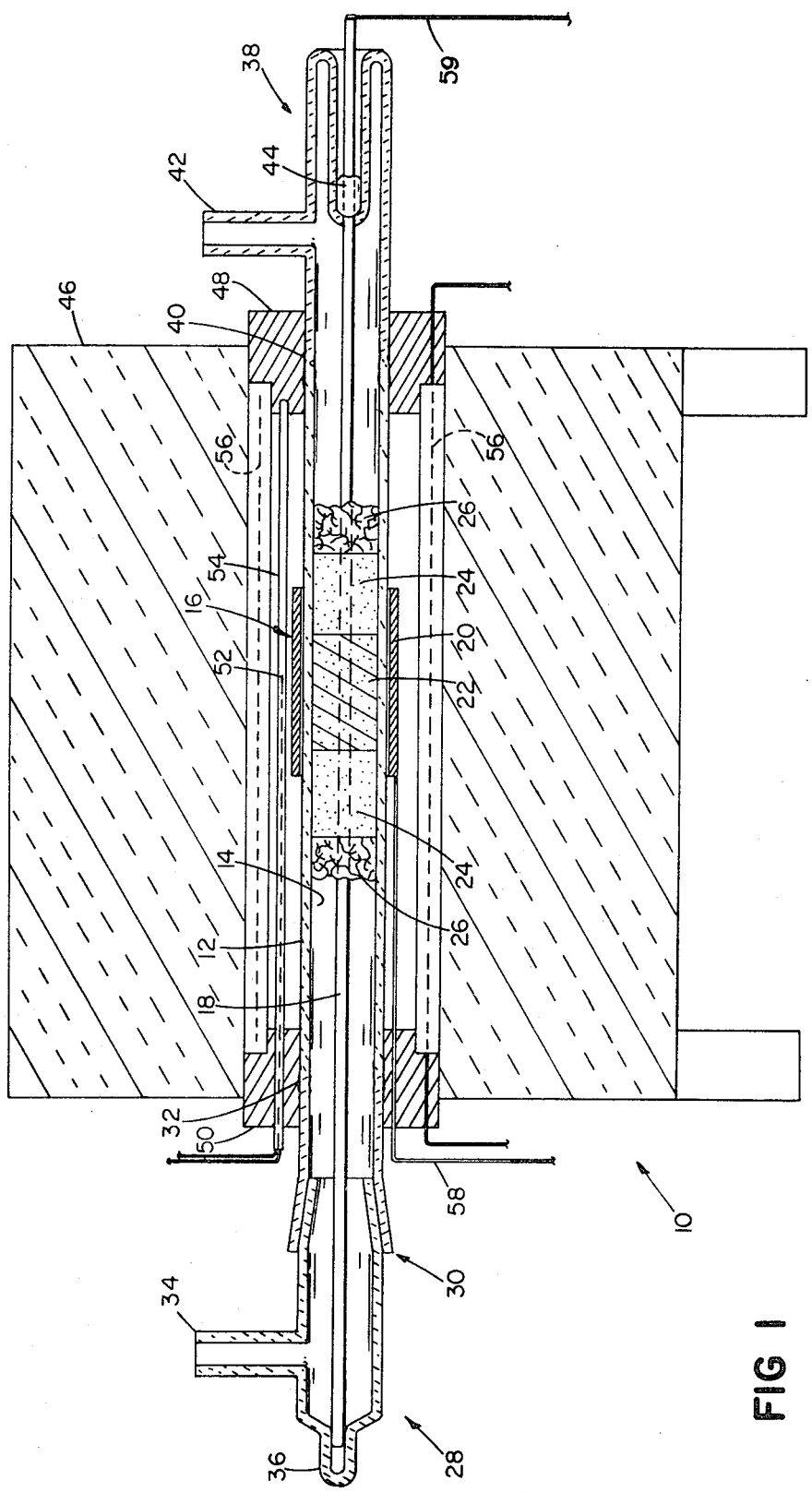
FIG. 1 is a longitudinal cross-section of a prototype reactor according to the invention.

Shown particularly in FIG. 1 is a prototype reactor 10 having tubular shaped wall 12 made of quartz 1 mm thick enclosing a chamber 14. Reaction zone 16 is situated within chamber 14 at a position approximately midway between the ends of chamber 14. A first electrode 18 made of 316 stainless steel and having a rod-like form 1/16-inch diameter is supported along the axis of chamber 14. A second electrode 20 in the form of a cylindrical sleeve (outside diameter one-half inch, wall thickness one-sixteenth inch) is situated around chamber wall 12 outside of reaction zone 16. A catalyst support bed 22 consisting of packed grains of porous alumina (to be described in greater detail hereinafter) is supported within chamber 14 and between electrode 18 and electrode 20. A filler 24 of glass sand is packed on either side against, and holds in place, the catalyst support bed 22. Pyrex wool backing 26 is stuffed into chamber 14 at either end of the reaction zone and holds glass sand 24 in place.

Pyrex glass inlet section 28, having a ground glass joint 30 to facilitate assembly, is attached to reactor wall 12 through graded glass seal 32. Inlet section 28 has a port 34 for admittance of reactants and support tip 36 slideably supporting an end of electrode 18. Pyrex glass outlet section 38 is attached to reactor wall 12 through graded seal 40. Outlet section 38 has an outlet port 42 and supports electrode 18 rigidly in Kovar seal 44. Cylindrical asbestos insulating wall 46 (inner diameter approximately 1 inch, wall thickness 2 inches) is supported coaxially around reactor wall 12 by asbestos insulator plugs 48 and 50. Thermocouple 52 is inserted in quartz thermowell 54 which passes through and is supported by asbestos plugs 48, 50. Heater element 56 is supported within insulating wall 46. Outer electrode lead 58 passes through insulator plug 50 and makes electrical contact with outer electrode 20. Inner electrode lead 59 is attached to and makes electrical contact with the end of inner electrode 18.

Figure 2C:
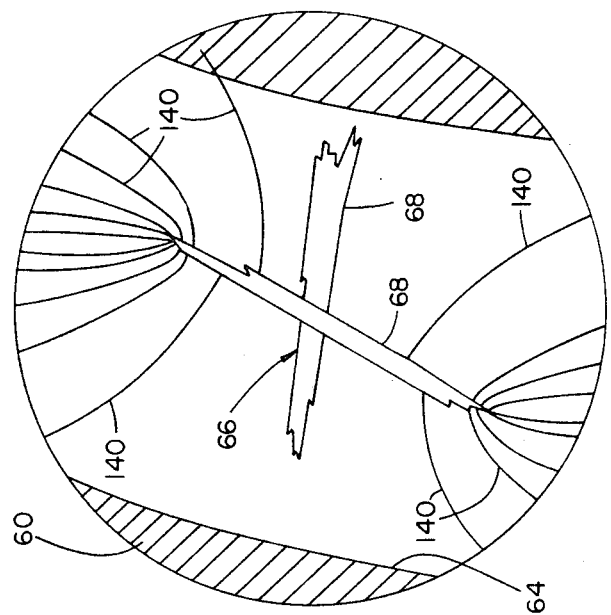
FIG. 2c is a still further enlarged cut away view showing a portion of the structure shown in FIG. 2b.
Figure 2B:
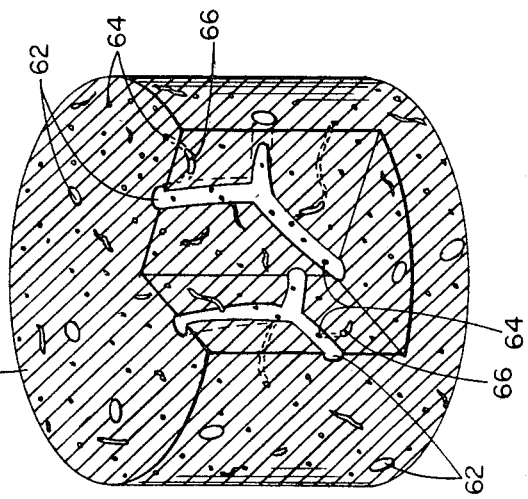
Figure 2A:
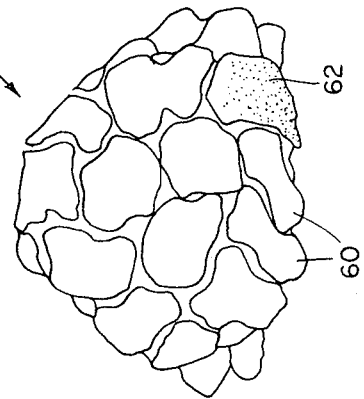
FIG. 2a is an enlarged view of a portion of the support bed in the reaction zone of the reactor shown in FIG. 1.

Referring now particularly to FIGS. 2a, 2b, and 2c, catalyst support 22 is a packed bed of irregularly shaped grains (approximately 0.1 mm across) of alumina, the grains being made by crushing catalyst pellets manufactured under the trade name "Harshaw CR-1404-P." Each grain 60 has a spongy, porous structure and is penetrated by a number of interconnecting channels 62. Branching out from channels 62 are a large number of smaller channels 64 which penetrate into the substance of grain 60. On the interior surface of channels 64 there are affixed to the surface of the alumina structure electrically conductive ( the term taken in a sense including both metals and semi-conductors) catalyst particles 66 consisting of clustered chromia needles 68 having sharp points (typically with radius of curvature less than 10A.). The chromia particles are individually supported on the surface of the channels separate one from another and so do not make electrical contact with each other. Channels 62 are typically 10,000A. or greater in diameter, small channels 64 are typically 5000A. or less in diameter, and chromia cluster particles are typically 100–2,000A. across. The catalyst support 22 typically has a surface area of 1 m$^2$/g to 700 m$^2$/g with up to 20 percent of its surface covered by chromia.

Figure 3:
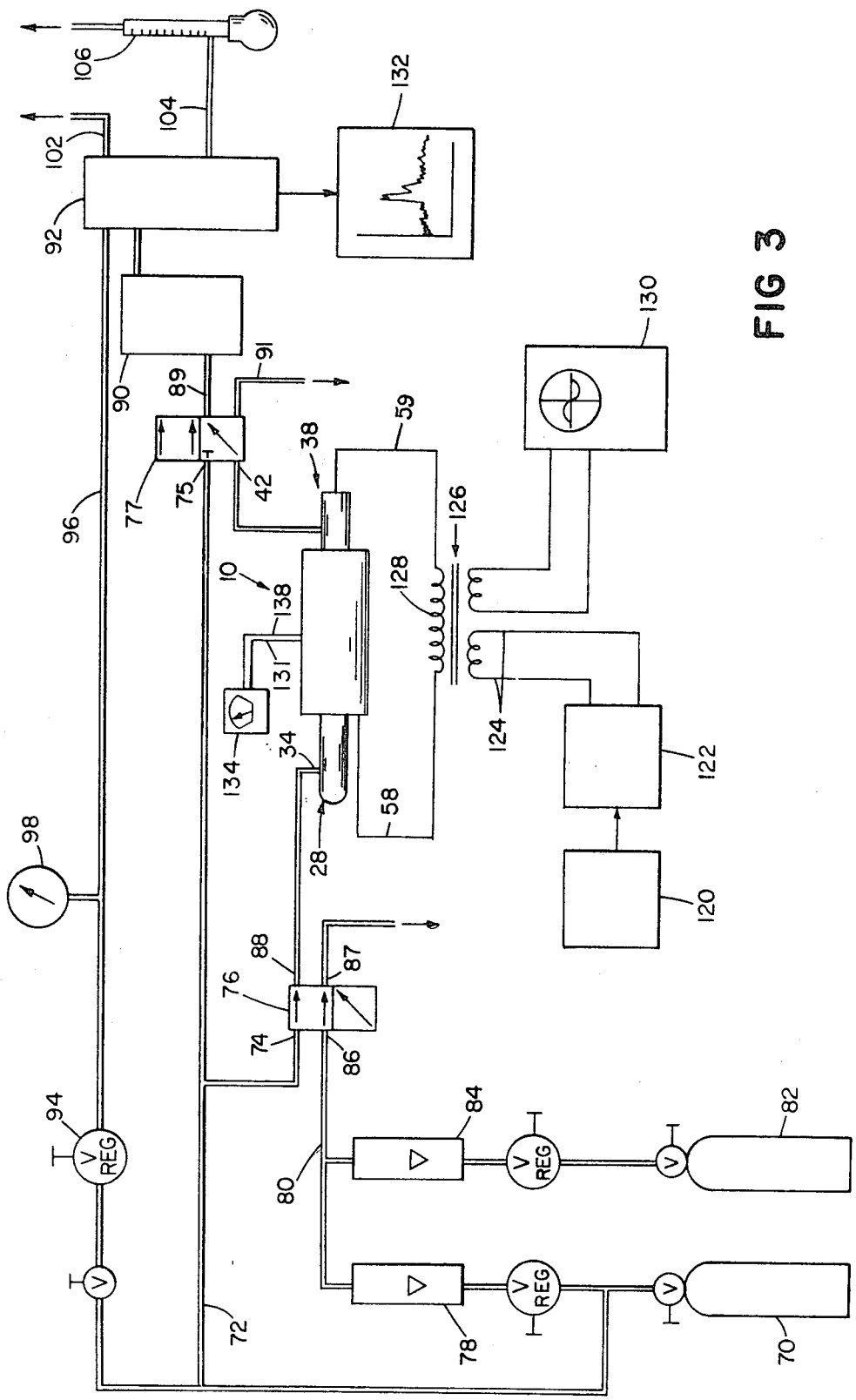
FIG. 3 is a schematic flow diagram for making propylene by dehydrogenation of propane according to the invention.

Referring now especially to FIG. 3 showing a flow diagram for making propylene according to the invention, helium from tank 70 is piped through conduit 72 to inlet ports 74 and 75 of sampling valves 76 and 77 respectively and also piped through rotameter 78 to mixing conduit 80. Propane tank 82 is piped through rotameter 84 to mixing conduit 80. Conduit 80 is piped to a second inlet port 86 of sampling valve 76. Sampling valve 76 has a dump vent 87 and an outflow conduit 88 piped to inlet port 34 of reactor 10. Outlet port 42 of reactor 10 is piped to an inlet of sampling valve 77. Conduit 89 leads from sampling valve 77 to chromatographic separation column 90, and conduit 91 from sampling valve 77 provides an outlet from the system. The outlet from chromatographic column 90 is piped to thermal conductivity cell 92. Helium from tank 70 is also piped to cell 92 through pressure regulator 94 and conduit 96. Pressure gage 98 is connected to conduit 96. Cell 92 has a dump vent 102 and an outlet port 104 piped to soap film meter 106. Signal generator 120 is connected to the input of amplifier 122. The output of amplifier 122 is connected through leads 124 to the input of transformer 126. The secondary winding 128 of transformer 126 is connected through lead 58 to the outer electrode and through lead 60 to the inner electrode of reactor 10. An output from transformer 126 is also connected to oscilliscope 130. Recorder 132 is connected to the output of thermal conductivity cell 92. Variac 134 is connected through leads 131 and 138 to the reactor heater element 56.

Prior to operation, the catalyst bed is prepared by raising the temperature of the reactor to 1,250° F. as monitored by thermocouple 52 and introducing air into the reaction chamber for 4 hours followed by hydrogen for 4 hours, then air for 4 hours, and finally hydrogen for 4 hours. After the bed is thus prepared, care is exercised to avoid exposing the bed to an oxidizing atmosphere.

The system may be operated in a pulsed production made with continuous production monitoring or a continuous production made with intermittent product monitoring. The pulsed production mode is primarily used for testing the system operation, whereas the continuous operation mode is suitable for production runs.

In pulsed mode operation, sample valve 76 is supplied with two different gas streams. The first of these, entering through inlet 74, is pure helium supplied from tank 70 through conduit 72. The second inlet 86 is supplied from mixing conduit 80 with a mixture of propane and helium in a definite mixture ratio which can be ascertained from the readings of rotometer 78 through which the helium flows and rotometer 84 through which the propane flows. In its quiescent condition, sampling valve 76 vents the propane-helium mixture through vent 87 and passes the pure helium through conduit 88 to inlet port 34 of reactor 10; The reactor is thus supplied with a pure helium stream which flows through the channels of the catalyst bed without change and then passes out of the reactor through port 42. From port 42 the stream passes through valve 77, which in the pulsed mode of operation connects port 42 to conduit 89, as shown in FIG. 3, through column 90, through soap film meter 106, and is discharged. With the pure helium flowing steadily, the temperature of the reactor is raised to the operating temperature by making appropriate adjustments of variac 134 supplying power to the reactor heater element 56. The electrical enhancement apparatus is energized, so that oscillator 120 supplies a voltage oscillating at a predetermined frequency to amplifier 122, which drives transformer 124. An oscillating voltage is consequently applied between electrodes 18 and 20 by winding 128 through leads 58 and 59. The voltage difference applied to the electrodes 18 and 20 produces an electric field extending from one electrode to the other through reaction zone 16 of the reactor. The field inductively polarizes each particle of chromia, redistributing the electric charge over the surface of each particle and producing especially high fields in the vicinity of the sharp points of the chromia needles. The approximate shape of the field is indicated in FIG. 2c by the field lines 140. The polarity of the induced surface charge and the direction of the field reverse periodically in response to the periodically reversing voltage difference applied to the electrodes. Sampling valve 76 is next actuated by manual operation, whereupon it admits a definite quantity (a typical quantity in the apparatus shown in FIG. 1 being 4cc) of the propane-helium mixture into conduit 88 while shutting off the stream of pure helium. A definite and known quantity of propane-helium mixture is thus introduced into the reactor. The increment of propane-helium mixture flows from inlet port 34 into chamber 14 where it is heated to reaction temperature (typically between 1,000°–1,100° F.) and then flows through the channels 62 and 64 in the alumina support bed in the reaction zone where it is exposed to contact with the chromia particles there supported and periodically polarized by the electric field. Some of the propane, under the catalytic effect of the chromia and the electric field undergoes a reaction forming propylene and hydrogen and other products in side reactions. The reaction products then pass on through the channels in the alumina bed to the outlet section 38 and thence out of the reactor through outlet port 42. From port 42 the reaction products flow through valve 77 and conduit 89 to chromatographic column 90 and thermal conductivity cell 92 where they are analyzed, and then through soap film meter 106 and are discharged from the system.

The operation of the system in the continuous mode is essentially the same except that sampling valve 76 after being actuated to admit propane-helium mixture to conduit 88 continues indefinitely to pass the mixture into conduit 88 and thence to the reactor, while sampling valve 77 is normally set to discharge product through conduit 91 and only intermittantly diverts the product stream to conduit 89 for measurement.

Typical values of parameters of the particular reactor shown in FIG. 1 and process are as follows:
Gas pressure: 25 psia
Mixed gas ratio: Propane/Helium = ⅓
Flow through reactor: 160 cc (STP) per min.
Bed surface area: 70 m²/g.
Fraction of surface in $Cr_2O_3$: 20 percent Typical production results using the described equipment and process are shown in Tables 1 and 2. Runs in which no electric field was present are included for comparison.

TABLE 1.—RESULTS OF CONTINUOUS MODE OPERATIONS

| Run Number | Temp., °F. | Volts | Freq., KHz | Conversion, percent | $C_3H_6$ | $C_2H_6$ | $C_2H_4$ | $CH_4$ | Notes |
|---|---|---|---|---|---|---|---|---|---|
| 1 | 72 | | | *0 | *0 | *0 | *0 | *0 | 1 |
| 2 | 72 | 360 | 1,500 | 0.3 | 0.1 | *0 | 0.2 | *0 | 1 |
| 3 | 72 | 1,200 | 1,500 | 4.0 | 2.4 | 0.5 | 0.4 | 0.7 | 1 |
| 4 | 1,025 | 0 | | 10.7 | 6.2 | 0.6 | 0.4 | 1.9 | 1 |
| 5 | 1,025 | 560 | 1,500 | 48.5 | 11.7 | 4.4 | 14.6 | 17.8 | 1 |
| 6 | 1,025 | 6,600 | 1,600 | 10.2 | 3.1 | 0.5 | 4.1 | 1.8 | 2 |
| 7 | 1,025 | 0 | | 1.2 | 0.7 | *0 | 0.3 | 0.2 | 3 |
| 8 | 1,025 | 1,800 | 1,500 | 1.0 | 0.7 | *0 | 0.2 | 0.1 | 3 |

¹ Chromia catalyst on alumina support.
² No catalyst or support.
³ Alumina support but no catalyst.
*Less than 0.002%.

TABLE 2
Results of Pulse Mode Operation

| Run No. | Temp. °F | Volts | Freq. Hz | Conversion % | Notes |
|---|---|---|---|---|---|
| 9 | 1050 | 0 | — | 0.8 | 1 |
| 10 | 1050 | 2580 | 1500 | 5.1 | 1 |

Table II —Continued

| 11 | 1100 | 0 | — | 1.4 | 1 |
|----|------|------|------|-----|---|
| 12 | 1100 | 2580 | 1500 | 7.8 | 1 |
| 13 | 1100 | 1700 | 500 | 1.2 | 1 |
| 14 | 1100 | 1700 | 1000 | 1.5 | 1 |
| 15 | 1100 | 1700 | 1500 | 1.9 | 1 |
| 16 | 1100 | 1700 | 2000 | 2.1 | 1 |
| 17 | 1100 | 1700 | 2500 | 2.8 | 1 |
| 18 | 1100 | 1700 | 4000 | 2.7 | 1 |

1 Chroma catalyst on alumina support

The enhanced conversion of propane as a result of the joint action of the catalyst particles and the electric field can be readily seen from the data of the tables, notably in comparing runs 4, 5, and 8. In run 8, where a voltage was applied but no catalyst particles were present, the conversion was 1.0 percent; in run 4, where catalyst particles were present but no voltage was applied, the conversion was 10.7 percent; in run 5 with both catalyst and applied voltage, the conversion rose to 48.5 percent. The effect of the joint action of the catalyst and electric field in changing the product mix is also evident from the data on continuous operation. The data on the pulsed operation indicates that the conversion is improved by increasing the applied voltage up to 2,580 volts and by increasing the frequency up to 2,500 Hz.

What is claimed is:

1. A reactor for effecting a chemical reaction therein through the action of an electrically conductive catalytic material effective to promote said reaction to a degree dependent on the surface electric charge on said material, said reactor having a wall defining a chamber, a reaction zone within said chamber, and an inlet to admit reactant to said chamber, comprising:
   a first electrode and a second electrode spaced therefrom, said electrodes being opposed across said reaction zone,
   a supporting structure of electrically non-conductive material supported between said electrodes and in said reaction zone and having channels for the passage of reactant and product material,
   a plurality of particles of said catalytic material supported in spaced relation to each other on said structure, said particles being electrically insulated one from another and from each of said electrodes and having surface portions exposed to direct contact with reactant in said channels, and
   means connected to said electrodes for inducing changes in surface charge on said surface portions by establishing an electrical potential difference between said electrodes.

2. The reactor of claim 1 including means for periodically reversing said potential difference.

3. The reactor of claim 2 including means for applying a potential difference having an rms value greater than 300 volts to said electrodes.

4. The reactor of claim 1 wherein the particles have exposed surface area in excess of 0.1 $m^2$ per gram of support structure.

5. The reactor of claim 4 wherein said particles have points with radii of curvature less than 100 A.

6. A reactor for effecting a chemical reaction therein through the action of an electrically conductive catalytic material effective to promote said reaction to a degree dependent on the surface electric charge on said material, said reactor having a wall of generally cylindrical form defining a chamber, with an inlet at one end and an outlet at the opposed end of the chamber and a reaction zone within the chamber at a position intermediate to the inlet and the outlet, comprising:
   a first electrode in the form of an axial rod and passing through the reaction zone,
   a second electrode in the form of a cylindrical shell around the reaction zone,
   a rigid supporting structure of electrically non-conductive material supported between said electrodes and in the reaction zone, the structure having channels for passage of reactant and product material,
   a plurality of particles of said catalytic material having points with radii of curvature less than 100 A., said particles supported in spaced relation on said structure so as to be electrically insulated one from another and having surface portions aggregating more than 0.1 $m^2$ per gram of structure exposed to direct contact with reactant in said channels, and
   means connected to said electrodes for inducing modification of surface charge on said particles by establishing an electric potential difference between said electrodes.

7. A process for effecting a chemical reaction in an electrically uncharged reactant to produce a product, comprising:
   introducing said reactant into a chemical reactor having walls defining a chamber, a reaction zone within said chamber, and an inlet to admit reactant to said chamber, a first electrode and a second electrode spaced therefrom, said electrodes being opposed across said reaction zone, a supporting structure of electrically non-conductive material supported between said electrodes and in said reaction zone, said structure having channels for passage of reactant and product material, a plurality of electrically conductive particles separately supported on said structure, said particles being electrically insulated one from another and having surface portions exposed to direct contact with reactant in said channels, said surface portions promoting said reaction to a degree dependent on the electric charge on said surface portions, and means connected to said electrodes for establishing an electrical potential difference between said electrodes,
   bringing said reactant into contact with said surface portions of said particles while simultaneously inducing changes in the surface charge on said exposed surface portions of said electrically conductive particles by applying an electric potential difference across said electrodes, and thereby enhancing production of said product, and withdrawing said product from said reactor.

8. The process of claim 7 wherein the exposed surface of said particles exceeds 0.1 $m^2$ per gram of support structure.

9. The process of claim 8 wherein said particles have points with radii of curvature less than 100 A.

10. The process of claim 7 wherein the potential difference is periodically reversed.

* * * * *